United States Patent [19]

Heymans et al.

[11] Patent Number: 4,772,828
[45] Date of Patent: Sep. 20, 1988

[54] CONTROL DEVICE SUPPLYING OPTIMUM POWER TO OSCILLATING DRIVE MOTOR FOR RESONANT-PISTON TYPE COMPRESSOR UNIT

[75] Inventors: Peter M. S. M. Heymans; Johannes J. van Herk; Fidelus A. Boon; Rokus C. D. Lissenburg, all of Eindhoven, Netherlands

[73] Assignee: U.S. Philips Corporation, New York, N.Y.

[21] Appl. No.: 48,191

[22] Filed: May 11, 1987

[30] Foreign Application Priority Data

Oct. 30, 1986 [NL] Netherlands ............... 8602728

[51] Int. Cl.[4] .................................. H02K 33/00
[52] U.S. Cl. ................................ 318/128; 310/36; 318/807
[58] Field of Search ............. 318/128, 132, 805, 807, 318/808, 809, 810, 811, 812, 127; 310/36, 39

[56] References Cited

U.S. PATENT DOCUMENTS

| 4,345,442 | 8/1982 | Dorman | 62/160 |
| 4,477,761 | 10/1984 | Wolf | 318/800 |
| 4,494,180 | 1/1985 | Streater et al. | 318/801 |

Primary Examiner—Mark O. Budd
Assistant Examiner—Judson H. Jones
Attorney, Agent, or Firm—Thomas A. Briody; David R. Treacy; Bernard Franzblau

[57] ABSTRACT

A control device (30) for controlling the supply of power to the coils (16A, 16B) of a drive motor (3) for a compressor unit of the resonant-piston type (1). The control device comprises a power-supply circuit (44) for energizing the motor coils from a direct voltage source (45), means (46, 47, 48; 46, 60) for determining a measure (P, $\phi$), which indicates whether the power consumption of the motor as a function of the frequency of the energizing current is at least approximately maximal, and means (40, 42, 43; 61, 42, 43) for adjusting the frequency of the energizing current, depending on the derived measure (P, $\phi$), to a value for which said measure indicates that the power consumption of the motor (3) is maximal.

10 Claims, 5 Drawing Sheets

CONTROL DEVICE SUPPLYING OPTIMUM POWER TO OSCILLATING DRIVE MOTOR FOR RESONANT-PISTON TYPE COMPRESSOR UNIT

BACKGROUND OF THE INVENTION

This invention relates to a control device for controlling the power supply to an oscillating motor for driving a compressor unit of the resonant-piston type, more particularly to a circuit for supplying alternating current from an electric power source to the oscillating motor.

The invention also relates to a compressor unit of the resonant-piston type provided with such a control device. Such a control device and compressor unit are known from the U.S. Pat. No. 4,345,442.

In the known compressor unit the piston is driven with an oscillating motion relative to the cylinder by means of an oscillating motor constructed as a linear motor. The frequency of this oscillating motion is substantially constant and is substantially equal to the resonant frequency of the spring-mass system constituted by the compressor and the oscillating motor. In order to obtain this oscillation the oscillating motor is energized with an alternating current having a constant frequency substantially equal to this frequency. Since the resonant system is mainly driven in resonance the power required for reciprocating the piston is relatively low, which makes it possible to use a motor with a lower driving power and hence smaller energizing currents. This has the advantage that the dimensions of the oscillating motor can be small, which is favorable for cost reasons. This is of particular importance in compressor systems for mass-manufactured products such as, for example, refrigerators and freezers. A known property of such compressors is that the resonant frequency varies continually as a result of changes in ambient parameters, such as for example temperature. This partly eliminates said advantage because the required driving power and energizing current increase rapidly as the difference between the actual operating frequency and the optimum operating frequency, which corresponds substantially to the resonant frequency, increases.

SUMMARY OF THE INVENTION

It is an object of the invention to provide a control device of the type defined in the opening paragraph, by means of which a compressor unit of the resonant-piston type is always operated at an optimum oscillating frequency. According to the invention this object is achieved in that the control device comprises detection means for deriving from the alternating current and the voltage across the motor a first measure which at least approximately indicates whether the power supplied to the compressor unit by the motor is maximal as a function of the frequency of the alternating current, and means for adjusting the frequency of the alternating current, depending on said first measure, to such a value that said first measure indicates that the said power supplied as a function of the frequency is at least substantially optimal.

By means of the control device according to the invention, the frequency of the alternating current is kept at a value for which the power supplied to the compressor unit, and thus the production of the compressor unit, e.g. the cold production in a refrigerator, is maximal. It was bound that in general, owing to the damping in the motor-compressor unit, this optimal frequency is not equal to the resonance frequency of the motor-compressor system. It appears that the optimal frequency is somewhat higher than the resonance frequency. A suitable measure for indicating whether the power supplied as a function of the frequency is maximal is the power which is taken from the electric power source by the motor with a constant amplitude of the alternating current. The maximum of the power taken from the electric power source indicates the optimal frequency. Another suitable measure is the amplitude of the alternating current with a constant power consumption of the motor. In this case the minimum of the amplitude indicates the optimal frequency. The advantage of the two measures described before is that they can be determined without additional sensors located in the motor-compressor system. This is of particular importance for compressor units for refrigerating and freezing systems and/or heat pumps, where it is customary to accommodate the compressor together with the drive motor in a hermetically sealed vessel filled with a refrigerant. The conditions obtaining in such vessels require the use of sensors which are specially adapted to these conditions. Moreover, when sensors are used this requires additional feed-throughs in the vessel wall for the passage of the signal wires connected to the sensors.

A favourable embodiment of the control device is characterized in that the control device comprises means for performing a measurement cycle at regular intervals, for which purpose the detection means comprise means for adjusting the frequency of the alternating current to a plurality of different frequency values and means for deriving the optimum frequency value from the different frequency settings and from the corresponding first measures determined by the detection means. The control device further comprises adaptation means for adapting the frequency of the alternating current after a measurement cycle to the optimum frequency thus determined.

A further embodiment is characterized in that the control device comprises comparator means for determining the difference between the determined optimum measure and the instantaneous measure determined by the detection means, and initiation means for initiating a measurement cycle if the difference thus determined exceeds predetermined limits. This embodiment has the advantage that the number of measurement cycles can be minimised. In practice, it has been found that for stability reasons it is preferable to select the frequency of the alternating current to be slightly below the optimum frequency. A particularly suitable embodiment of the control device is therefore characterized in that the adaptation means are constructed to adjust the frequency of the alternating current to a frequency equal to the optimum frequency minus a specific value.

Another embodiment of the control device is characterized in that the control device comprises means for iteratively determining the optimum frequency. This embodiment has the advantage that the optimum frequency is determined in a limited number of iteration steps and hence in a comparatively short time.

BRIEF DESCRIPTION OF THE DRAWINGS

Embodiments of the invention and further advantages thereof will now be described in more detail, by way of example, with reference to the accompanying drawing in which.

DESCRIPTION OF THE PREFERRED EMBODIMENTS

Figure 1:
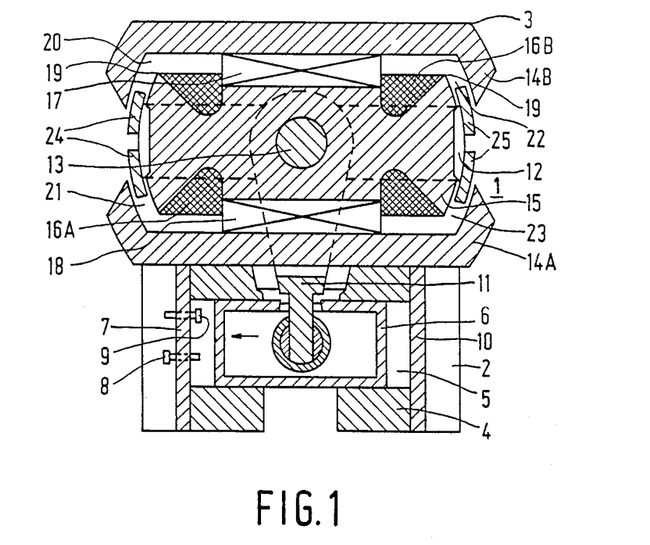
FIG. 1 shows a compressor unit of the resonant-piston type in which the control device in accordance with the invention may be used.

FIG. 1 shows a compressor unit 1 comprising a compressor 2 of the resonant-piston type and an oscillating motor 3 for driving the compressor 2. Such a compressor 2 and oscillating motor 3 are described comprehensively in the U.S. Pat. No. 4,626,717. This compressor 2 has a housing 4 which bounds a cylindrical cavity 5 in which the piston 6 is movable. At one end the cavity 5 is closed by a plate 7 in which a gas inlet valve 8 and a gas outlet valve 9 are mounted in the customary manner. The other end of the cavity 5 is closed by a plate 10, forming a variable-volume chamber with one end of the piston 6, which chamber contains an amount of gas. This variable-volume chamber forms a gas spring. The other closed end of the piston 6 constitutes one of the walls of a variable-volume chamber in which for example the refrigerant of a refrigerating system is compressed, the refrigerant being supplied and discharged via the valves 8 and 9. By means of a lever 11 the piston 6 is coupled to an armature 12 of the oscillating motor 3. The armature 12 is rotatably mounted on a motor shaft 13. The oscillating motor further comprises a stator 14 (14A, 14B) and a core 15 with two coils 16A and 16B arranged opposite one another. Two magnets 17 and 18 are arranged between the core 15 and the stator 14. At the end faces 19 of the coils 16 which are remote from each other, circularly curved air gaps 20, 21, 22 and 23 are formed in which sliding elements 24 and 25 of the armature are movable. If in such an oscillating motor 3 the coils 16 are energized with an alternating current the magnetic field generated in the air gaps (20, 21, 22, 23) by the magnets 18 and 19 and the coils 16 cause the sliding elements 24 and 25 of the armature to perform an oscillating motion in the circular air gaps 20, 21, 22 and 23 with a frequency corresponding to the frequency of the energising current through the coils 16. This oscillating motion of the armature 12 is transmitted to the piston 6 via the lever 11.

Figure 2A:
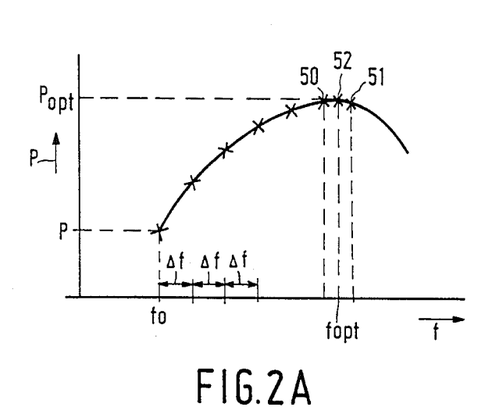
FIGS. 2A and 2B represent the power consumption of the oscillating motor as a function of the frequency of the energising current.

For the spring-mass system constituted by the compressor 2 and the oscillating motor 3, FIG. 2A shows the power consumption P of the oscillating motor as a function of the frequency of a constant-amplitude energising current I. The power consumption P exhibits a maximum Popt at the frequency fopt. Since the amplitude of the current I is constant the losses in the motor are substantially constant for the given frequency range.

The losses in the motor comprise copper and iron losses which depend on the amplitude and frequency of the alternating current through the motor. Since the iron losses are substantially smaller than the copper losses and the copper loss is independent of the frequency, the power delivered to the compressor by the motor is also maximal for the frequency fopt, which means that the amplitude of the reciprocating motion performed by the piston 6 is maximal. When the compressor 2 is used in a refrigerating system, this also means that the maximum cold production is obtained for this frequency. If the oscillating motor 3 is energised with an alternating current having the optimum frequency fopt, the current required for a specific cold production is always minimal which means that the dimensions of the motor can be particularly small and also that the losses in the motor are minimised.

Figure 3:
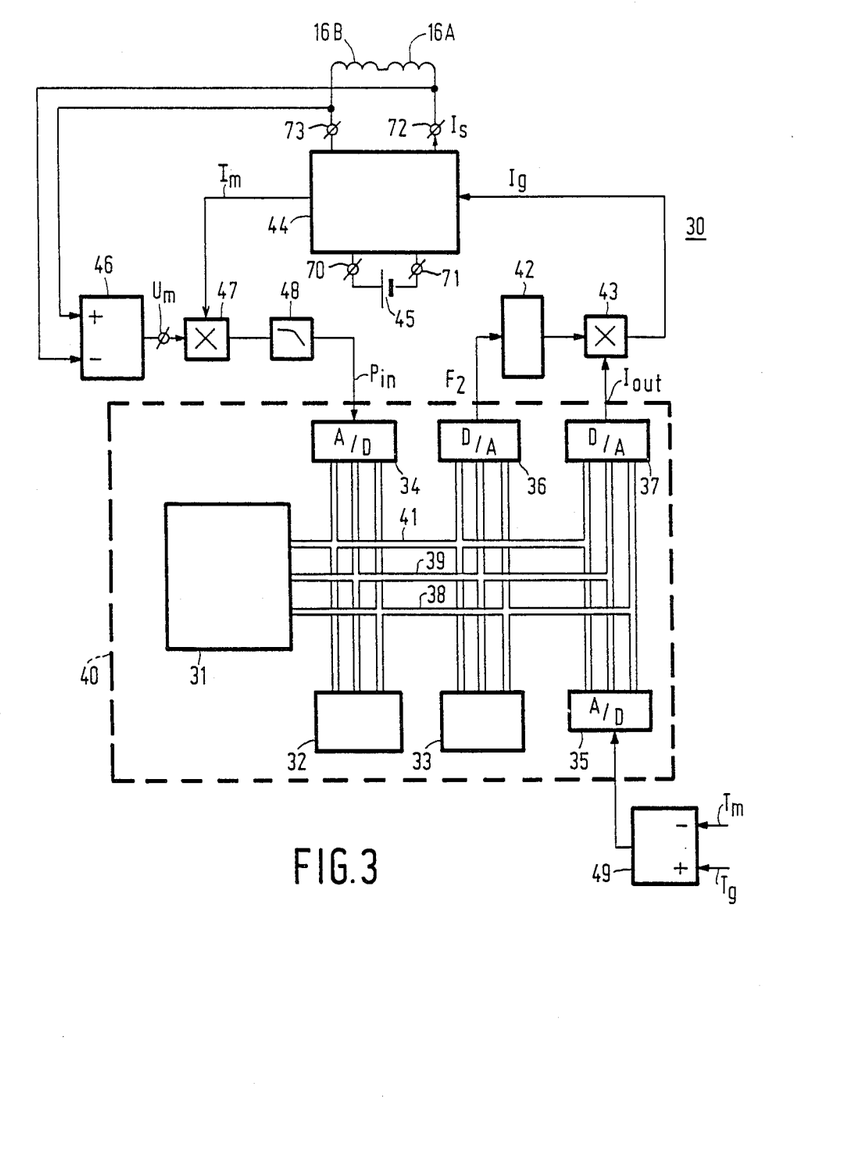
FIG. 3 shows an embodiment of the control device in accordance with the invention.

In practice it has been found that the relationship between the power consumption and the frequency depends strongly on ambient parameters such as, for example, the temperature in the compressor, with the result that the optimum frequency fopt changes constantly during operation. An embodiment of a control device 30 in accordance with the invention, by means of which the optimum frequency is determined at regular intervals and subsequently the frequency of the energizing motor is set to a specific optimum frequency fopt, is shown in FIG. 3. The control device 30 comprises a programmable control unit 40 of a customary type comprising, a central processing unit 31 (CPU), a read-only memory 32 (ROM), a random-access memory 33 (RAM), analog-to-digital converters 34 and 35, and digital-to-analog converters 36 and 37. The memories 32 and 33 and the analog-to-digital converters 34 and 35 and the digital-to-analog converters are coupled to the central processing unit 31 in a customary manner via an address bus 38, a data bus 39 and a control bus 41. The analog output of the digital-to-analog converter 36 is connected to the control input of a voltage-controlled oscillator 42 of a customary type, which generates a sinewave output signal of constant amplitude and a frequency which depends on the value of the voltage on the control input. The output signal of the oscillator 42 is applied to a first input of a multiplier 43, while a second input of the multiplier is connected to the analog output of the digital-to-analog converter 37. The output signal Ig of the multiplier 43, which represents the product of the output signals of the oscillator 42 and the digital-to-analog converter 37, is applied to a power-supply circuit 44 which is arranged between a direct-voltage source 45 and the motor coils 16. The power-supply circuit 44 is of a type which energizes the coils 16 from a direct voltage source 45 with a current Is which is proportional to the instantaneous value of the signal Ig. The power-supply circuit 44 further comprises a measurement circuit for measuring the energising current and generating a measurement signal Im which is proportional to the measured energizing current. The power-supply circuit 44 will be described in more detail with reference to FIG. 9.

The output terminals of the coils 16 are connected to the inverting and to the non-inverting input of a differential amplifier 46 for measuring the voltage across the motor. The differential amplifier 46 then generates a signal Um which is proportional to the voltage across the motor. The signal Um is applied to a first input of a multiplier 47 and the signal Im is applied to a second input of this multiplier, so that the output signal of the multiplier 47 is representative of the instantaneous electric power consumption of the motor 3. The output signal of the multiplier 47 is applied to a low-pass filter 48 so that the output signal Pin of the low-pass filter 48 is representative of the average power consumption of the motor 3. The signal Pin is applied to the input of an analog-to-digital converter 34. Further, a signal Tm is applied to the inverting input and a signal Tg to the non-inverting input of a differential amplifier 49. The signal Tm represents the temperature of the space to be cooled, measured by means of a sensor (not shown). The signal Tg represents the desired temperature. The output signal Tin of the differential amplifier, which is representative of the difference between Tm and Tg, is applied to the input of an analog-to-digital converter 35.

The central processing unit 31 carries out a program stored in the read-only member 32. While this program is carried out the optimum frequency of the energising current is determined at regular intervals. Each time that the optimum frequency has been determined the frequency of the energising current is adapted (adjusted). A flow chart of such a program is illustrated in FIGS. 4, 5, and 6.

Figures 4, 5A, 5B, 6:
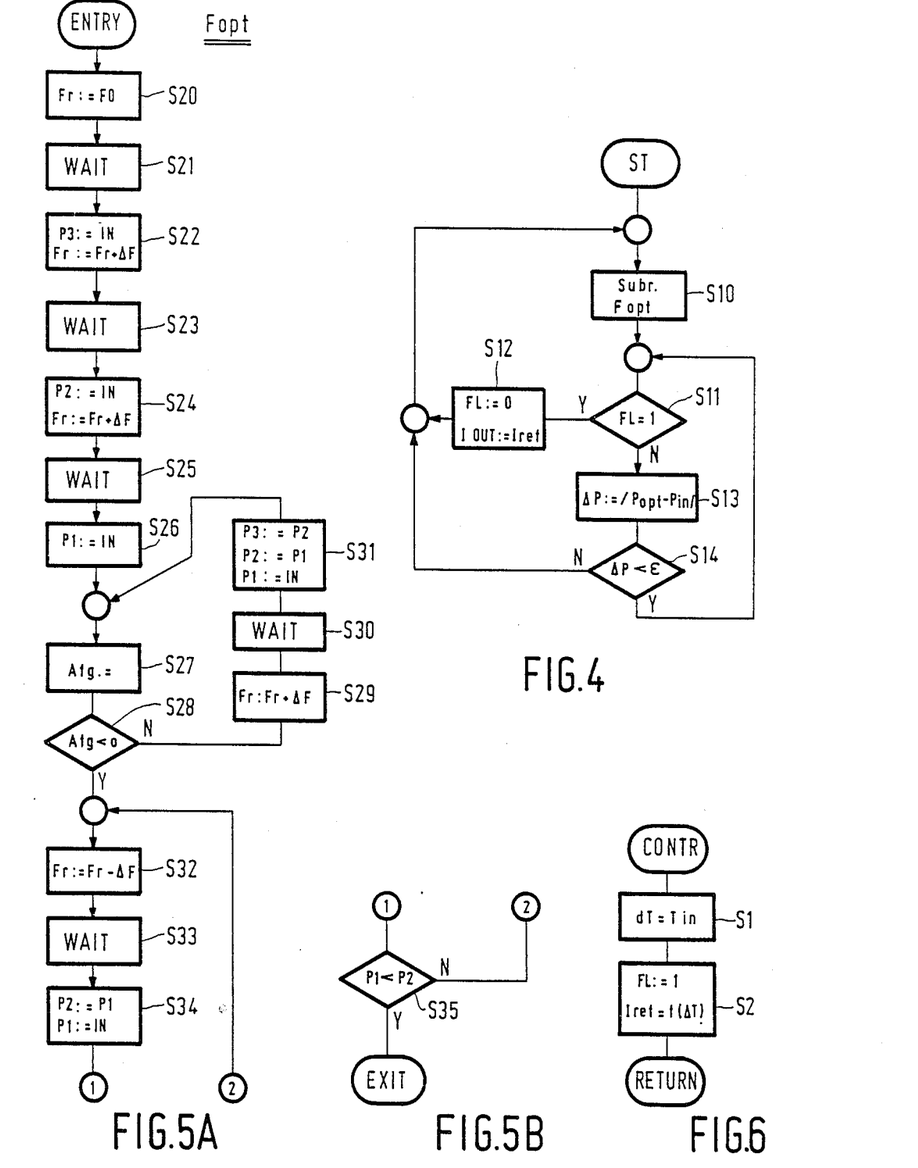
FIGS. 4, 5A, 5B and 6 are flow charts of the program performed by the embodiment shown in FIG. 3.

FIG. 4 shows the flow chart of the main program which is carried out constantly by the central processing unit 31. During the step S10 a subroutine Fopt is performed to determine the optimum frequency Fopt and the corresponding value of the power consumption Popt, and the frequency of the energizing current of the motor is adapted to the optimum frequency fopt thus determined. Subsequently, in the step S11 it is ascertained whether a flag FL has been set to the logic value "1". This flag indicates whether the desired value Iref of the amplitude of the energising current must be adapted. Should this be the case, the new value of Iref is applied to the digital-to-analog converter 37 during the step S12, which converter converts the digital value Iref into the signal Iout for adjusting the amplitude of the energising current via the multiplier 43. Moreover, the flag FL is reset to the logic value "0" during the step S12. After the step S12 has been performed the program proceeds with the step S10. However, if during the step S11 it has been found that the flag FL has not yet been set to the logic value "1", the step S11 is followed by the step S13. During the step S13 the digital value of Pin at the output of the analog-to-digital converter 34 is read by the central processing unit 31. This digital value of Pin, which represents the power consumption of the motor 3, is compared with the optimum value Popt. Further, the absolute value ΔP of the difference between Popt and Pin is determined. Subsequently, during the step S14 it is ascertained whether the absolute value ΔP of the difference is smaller than a predetermined small value ε. If it is smaller, this means that the motor 3 is still energised with an alternating current whose frequency is near the optimum value Fopt. In that case the program proceeds with the step S14. However, if the value ΔP is larger than ε, this means that as a result of varying operating parameters, such as for example the temperature of the medium in the compressor 2, the frequency fopt of the energising current no longer corresponds to the actual optimum value. In that case the program proceeds with the step S10, after which the optimum frequency fopt is determined again during the subroutine Fopt.

FIGS. 5A and 5B are flow charts of the subroutine Fopt. After the subroutine Fopt has been called the frequency of the energising current is first of all set to an initial value fo during the step S20. The central processing unit 31 then transfers a digital value Fo, which represents the initial value fo (see FIG. 3A), to the digital-to-analog converter 36. The digital-to-analog converter 56 converts the digital value Fo into the signal Fr for adjusting the frequency of the alternating current via the voltage-controlled oscillator 42. Subsequently, during the step S21 a waiting time is observed to allow the resonant system to adjust to the new frequency. Subsequently, during the step S22 the power-consumption values corresponding to the new frequency setting is read in via the analog-to-digital converter 34 and is stored in the random-access memory 33 as a variable P3. Moreover, the output signal Fr is incremented by a constant value ΔF, which corresponds to a frequency change ΔF (see FIG. 2A). As a result of this, the frequency of the energising current is set to a new value equal to fo+Δf.

During the steps S23, S24, S25 and S26 the power consumption values at the frequencies fo+Δf and fo+2Δf are determined and stored as the variaBLES P2 and P1 respectively. During S27 an estimate of the derivative Afg (=dp/df) for the last frequency setting is derived from the values of P1, P2, P3 and ΔF in accordance with the following relationship:

$$Afg = \frac{3P1 - 4P2 + P3}{\Delta F}$$

Figure 2B:
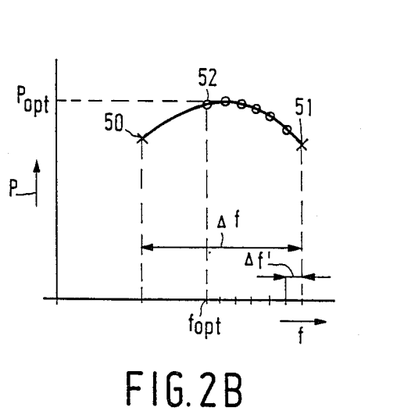

During the step S28 it is ascertained whether the derivative Afg is smaller than zero. If it is not smaller, this means that each maximum of P is not yet reached. During the steps S29, S30 and S31 the frequency of the alternating voltage is then again incremented by the value Δf and a corresponding value of the power consumption is determined and stored in P1. Moreover, the values of P2 and P3, which represent the power-consumption values for the two preceding frequency settings are adapted. Subsequently, during the step S27 the derivative for the new frequency setting is determined. The program loop formed by the steps S27, S28, S29, S30 and S31 is repeated until the derivative Afg thus determined is smaller than zero. This indicates that the optimum frequency is situated between the last and penultimate frequency setting, indicated by the reference numerals 50 and 51 in FIG. 2A. During the step S32 the value of Fr is then decremented by a value ΔF' which is substantially smaller than the value ΔF, so that the frequency of the energizing current is reduced by a small value Δf' (see FIG. 2B). After a waiting step S33 the power consumption for the new frequency setting is determined in the step S34. Subsequently, during the step S35 it is ascertained whether the last power consumption value determined, represented by P2, is smaller than the penultimately determined power, represented by Pr. If it is not smaller, the program proceeds with the step S35. The program loop comprising the steps S32, S33, S34 and S35 is repeated until the last power consumption value determined is smaller than the power consumption determined penultimately. (The corresponding frequency f and the power consumption are represented by the circle 52 in FIG. 2B). In that case the last power consumption value determined is substantially equal to the maximum value, which means that the corresponding frequency is substantially equal to the optimum frequency fopt of the energizing current, so that the subroutine Fopt is terminated. In practice, it has been found that for reasons of stability it may be desirable not to set the frequency of the alternating current to a value for which the power consumption is maximal but to a frequency which is slightly lower than this frequency. After the optimum frequency has been determined in accordance with the said subroutine Fopt the frequency of the alternating current may then be set to the optimum frequency thus determined minus a predetermined value. It will be obvious to those skilled in the art that the program, described by way of example with reference to FIG. 5, for determining a maximum in the relationship between the power consumption and the frequency setting, may readily be replaced by any other known program for determining the maximum.

The main program Main is interrupted at constant intervals. During these interruptions a control program Control for determining the desired amplitude of the energising current is carried out. A flow chart of an example of this control program is given in FIG. 6. During the first step S1 of this control program Control the digitised value Tin is applied to the outputs of the analog-to-digital converter 35 by the central processing unit 31. Subsequently, during the step S2 a new desired value Iref for the amplitude of the energising current is determined in accordance with a customary control algorithm of a kind which adjusts the desired value Iref to a value at which the desired temperature Tg and the measured temperature in the space to be cooled are maintained substantially equal to each other. Further, during the step S2 the flag FL is set to the logic value "1" to indicate that the setting of the amplitude of the energising current must be adapted during the next time that the steps S11 and S12 of the main program are carried out. After termination of the control program Control the main program Main is resumed.

In the embodiment of the invention described in the foregoing the optimum frequency of the energising current is determined by changing the frequency of the energizing current and at the same time determining the power consumption of the motor while the amplitude of the energising current is maintained constant. The maximum power consumption is then derived from the value of the power consumption thus determined. However, the optimum frequency can be determined in various other ways, for example by maintaining the power consumption of the motor constant by means of a control system, the frequency of the energizing current being varied. By simultaneously determining the amplitude of the corresponding energizing current and subsequently deriving the frequency for which the amplitude of the energizing current is minimal from the value of the amplitude and the associated frequency thus determined, it is also possible to find the optimum frequency.

In the embodiment described in the preceding the measure for determining the optimal frequency is directly derived from the motor current and the motor voltage. It will be clear that this measure also may be derived from the current and voltage of the electric power source. In the event that the control device is fed from the mains via a rectifier, the said measure also may be derived from the mains voltage and the current taken from by the mains from the control device because the electric power consumption of the electronics of the control circuit is negligible with respect to the power consumption of the motor. Therefore, it can be considered that all of the power taken from the mains is consumed by the motor.

It is alternatively possible to derive a frequency for which the power consumption is substantially maximal from the phase difference between the energizing current and the energizing voltage as a function of the frequency. This method is particularly suitable for motors in which the voltage drop across the inductance is very small relative to the counter-emf generated in the motor coils by the rotor motion. In that case the phase difference between the counter-emf and the energizing current is substantially equal to the phase difference between the voltage across the motor and the energising current.

Since the power delivered by the motor and hence the cold production is substantially maximal if the energising current and the counter-emf are in phase, the maximum power consumption as a function of the frequency in a motor with a very low inductance is substantially optimal if the phase difference $\phi$ between the energizing current and the energising voltage is zero. By now varying the frequency and determining the value of $\cos \phi$ for different frequencies by means of a $\cos \phi$ detector, and subsequently deriving the frequency for which $\cos \phi$ is maximal from the values determined for $\cos \phi$ and the corresponding frequencies, it is also possible to find a substantially optimum frequency. However, a signal by means of which the frequency can be adapted can also be derived directly from the phase difference.

Figure 7:
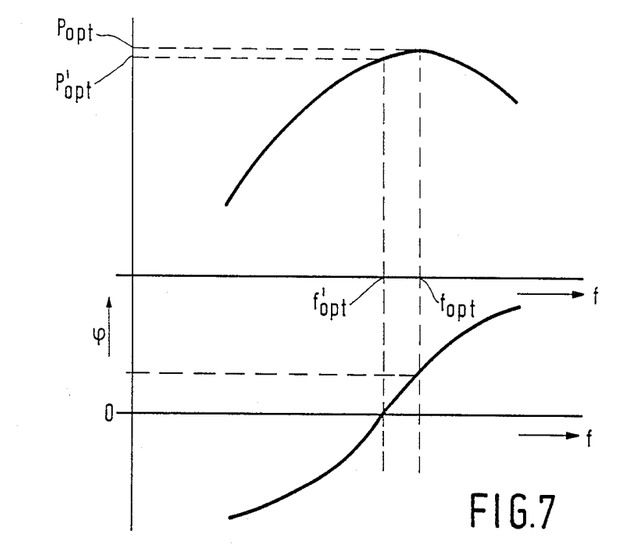
FIG. 7 illustrates the relationship between the phase difference between the energizing current and the energising voltage and the power consumption of the motor as a function of the frequency of the energising current.

FIG. 7 gives the power consumption P and the phase difference $\phi$ between the energising current and the energizing voltage as a function of the frequency f of the energizing current. If the frequency f is lower than the optimum frequency fopt the energizing voltage leads the energizing current ($\phi<0$). In the case where the frequency f is substantially higher than the optimum frequency fopt the energizing voltage lags the energizing current ($\phi>0$). If the frequency is situated near the optimum frequency the phase difference $\phi$ is small. For a frequency f'opt for which the phase difference $\phi$ is zero the power consumption P'opt is equal to the optimum value Popt but for a small error.

Figure 8:
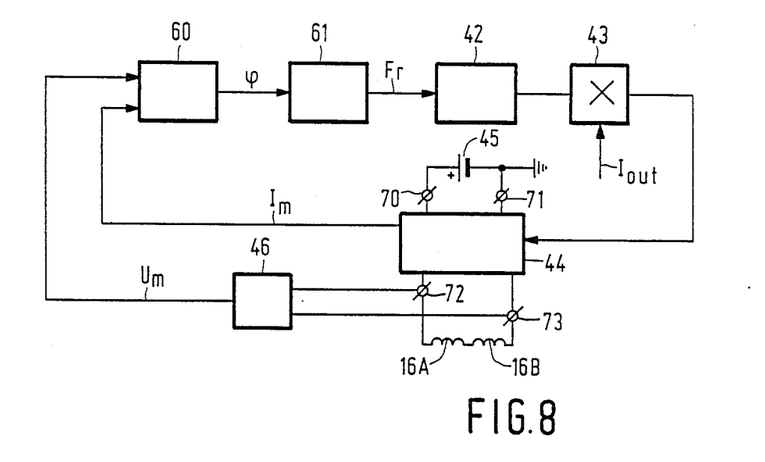
FIG. 8 shows another embodiment of the control device.

FIG. 8 shows an embodiment of a control device in which the frequency of the energising current is adapted depending on the phase difference $\phi$. In FIG. 8 the elements corresponding to the elements already shown in FIG. 3 bear the same reference numerals.

The signals Um and Im representing the instantaneous values of the energising voltage across the motor and the energising current through the motor are applied to a phase detector 60 of the customary type for determining the phase difference between the signals Um and Im. The output signal of the phase detector 60, which represents the phase difference, is applied to a control circuit 61 of a customary type which adjusts Fr depending on the output signal of the phase detector 60 in such a way that the phase difference $\phi$ remains substantially zero.

Figure 9:
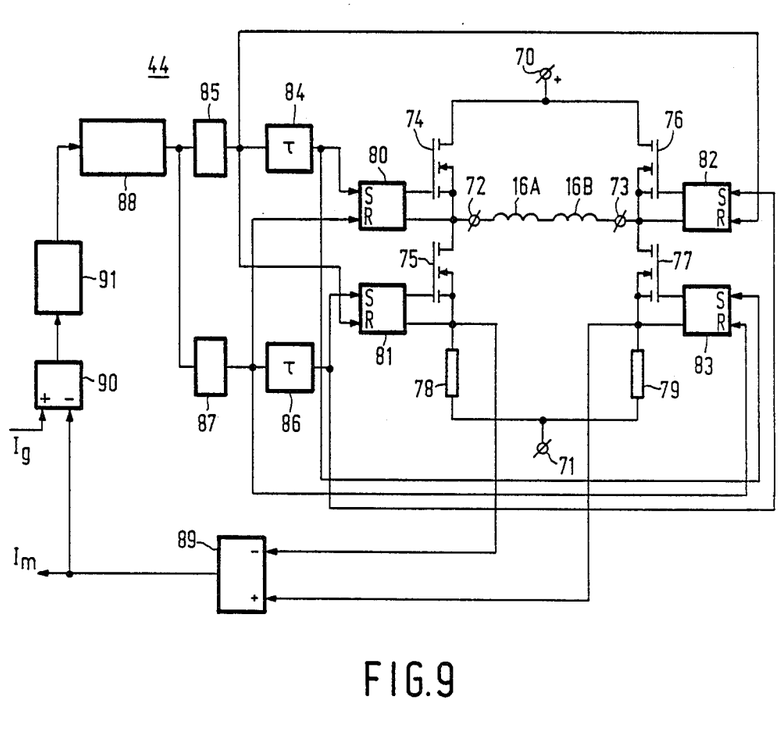
FIG. 9 is a detailed diagram of a power-supply circuit suitable for use in the control devices shown in FIGS. 3 and 8.

FIG. 9 shows an example of the energizing circuit 44. One terminal 72 of the series arrangement of the coils 16A and 16B of the motor 3 is coupled to a positive power-supply terminal 70 and a negative power-supply terminal 71 of the direct voltage source 44 via electronic switches 74 and 75 respectively, comprising, for example, power transistors of the FET type. The other terminal 73 of the series arrangement of the coils 16A and 16B is coupled to the positive power-supply terminal 70 and the negative power-supply terminal 71 via similar electronic switches 76 and 77 respectively. The switches 74, 77 are each arranged in parallel with a protection circuit, not shown, of a customary type. A low-impedance resistor 78 and a low-impedance resistor 79 are arranged respectively in the connection between the switch 75 and the power-supply terminal 71 and in the connection between the switch 77 and the power-supply terminal 71.

The switches 74, ..., 77 are controlled by means of control circuits 80, ..., 83. The control circuits 80, ..., 83 are of a customary type which generate a control signal for opening the switch in response to a pulse on an "R" input and which generate a control signal for closing the switch in response to a pulse on an "S" input. The "S" inputs of the control circuits 80 and 83 of the two diagonally opposed switches 74 and 77 are connected to the output of the pulse generator 85 via a delay circuit 84. Similarly, the "S" inputs of the control circuits 81 and 82 of the other two diagonally opposed switches 75 and 76 are connected to the output of a pulse generator 87 via a delay circuit 86. The "R" inputs of the control circuits 80, 83, and 81, 82 are connected to the outputs of the respective pulse generators 87 and 85.

The pulse generator 85 is of a type which generates a pulse in response to a logic 0-1 transition on its input, for example a monostable multivibrator. The pulse generator 87 is of the type which generates a pulse in response to a logic 1-0 transition on its input. The inputs of the pulse generators 85 and 87 are connected to the output of a pulse-width modulator 88 of a type generating a pulse-width modulated output signal whose frequency is substantially higher than the frequency of the desired energizing current and which has a duty cycle which is determined by the amplitude of the signal on its input. By means of the control system described herein, in response to a 0-1 transition of the output signal of the pulse-width modulator 88, the diagonally opposed switches 75, 76 are opened (turned off) and a short time afterwards, determined by the delay circuit 84, the two other diagonally opposed switches 74 and 77 are closed (turned on). The coils 16A and 16B are then connected to the power-supply terminals 70 and 71 via the switches 74 and 77. Upon the next logic 1-0 transition of the output signal of the pulse-width modulator 88 the switches 74 and 77 are opened and shortly after this the switches 75 and 76 are closed. The coils 16A and 16B are then connected to the power-supply terminals 70 and 71 via the switches 75 and 76. In this way the coils 16A and 16B are energized with an average voltage which is determined by the duty cycle of the output signal of the pulse-width modulator 88. The high-frequency voltage component produced by change-over of the switches 74, ..., 77 hardly affects the energizing current of the motor as a result of the inductance of the motor coils. The energising current through the motor is determined by means of a differential amplifier 89, whose inverting input is connected to the junction point between the resistor 78 and the switch 75 and whose non-inverting input is connected to the junction point between the switch 77 and the resistor 79. The output signal Im of the differential amplifier 89, which is proportional to the voltage difference between said junction points, is consequently proportional to the energising current through the coils 16A and 16B.

The signal Im is applied to the inverting input of the differential amplifier 90. The signal Ig from the multiplier 43 is applied to the non-inverting input of the differential amplifier 90, which signal Ig is representative of the desired instantaneous value of the energising current. The output signal of the differential amplifier 90, which is representative of the difference between the desired value Ig and the measured value Im of the energising current, is applied to a control circuit 91 of a customary type, for example an integrating control circuit. The control circuit 91 is dimensioned in such a way that depending on the difference between Ig and Im it generates a control signal for the pulse-width modulator 88 such that the duty cycle of the output signal is set to a value for which the energizing current produced by the average voltage across the coils 16A and 16B is set to a value for which said difference between Ig and Im is maintained substantially equal to zero.

What is claimed is:

1. A control device for controlling the power supplied to an oscillating motor for driving a compressor unit of the resonant-piston type having a mechanical resonant frequency that varies as a function of at least one ambient parameter, comprising, a circuit for supplying alternating current from an electric power source to the oscillating motor at a frequency corresponding closely to the instantaneous mechanical resonant frequency of the motor-compressor unit combination, detection means for deriving a first signal measure which substantially indicates when the power supplied to the motor is a maximum as a function of the frequency of the alternating current, and means for adjusting the frequency of the alternating current, depending on said first signal measure, to a frequency value such that the power supplied to the motor is close to the maximum for said instantaneous mechanical resonant frequency.

2. A control device as claimed in claim 1, further comprising control means for maintaining the amplitude of the alternating current constant during at least the derivation of the first signal measure, and wherein the detection means include means for determining the power consumption of the motor as said first signal measure.

3. A control device as claimed in claim 1, further comprising control means for maintaining the power consumption of the motor constant during at least the derivation of the first signal measure, and wherein the detection means include means for determining the amplitude of the alternating current as said first signal measure.

4. A control device as claimed in claim 1, wherein the detection means comprise measuring means for performing a measurement cycle at regular intervals, said measuring means producing frequency control signals for the frequency adjusting means whereby said frequency adjusting means vary the frequency of the alternating current to a plurality of different frequency values, and said measuring means includes means for deriving an optimum frequency value from the different frequency values and from the corresponding first signal measure derived by the detection means, and wherein the frequency adjusting means adjust the frequency of the alternating current after a measurement cycle to said optimum frequency value.

5. A control device as claimed in claim 4, further comprising comparator means for determining the difference between the maximum value of power determined in a preceding measuring cycle and the instantaneous measure determined by the detection means, and initiation means for initiating a measurement cycle if the difference thus determined exceeds predetermined limits.

6. A control device as claimed in claim 4 characterized in that the control device comprises means for iteratively determining the optimum frequency.

7. A control device as claimed in claim 4 wherein said frequency control signals control the frequency adjusting means so as to adjust the frequency of the alternating current to a frequency equal to the optimum frequency minus a specific frequency value.

8. A control system comprising: a compressor unit of the resonant-piston type whose mechanical resonant frequency varies with at least one ambient parameter, an oscillating motor mechanically coupled to the compressor unit for driving said compressor unit, and a control device as claimed in claim 1 for controlling the frequency of an alternating current supplied to windings of the oscillating motor from an electric power source.

9. A control device for controlling the power supplied to an oscillating motor for driving a compressor unit of the resonant-piston type comprising, a circuit for supplying alternating current to the oscillating motor, measuring means for performing a measurement cycle at regular intervals, said measuring means comprising means for varying the frequency of the alternating current, means for determining a value indicative of the power supplied to the motor at various frequencies produced by said frequency varying means during a measurement cycle, means for selecting an optimum frequency for which the power supplied to the motor is a maximum, and means for setting the frequency of the motor alternating current to a value substantially equal to the optimum frequency after termination of the measuring cycle.

10. A control device as claimed in claim 9 further comprising means for maintaining the amplitude of the alternating current constant at least during the measurement cycle.

* * * * *